US011996789B2

(12) United States Patent
Torrico-Bascopé

(10) Patent No.: US 11,996,789 B2
(45) Date of Patent: May 28, 2024

(54) BRIDGELESS SINGLE-PHASE PFC MULTI-LEVEL TOTEM-POLE POWER CONVERTER

(71) Applicant: Huawei Digital Power Technologies Co., Ltd., Shenzhen (CN)

(72) Inventor: Grover Victor Torrico-Bascopé, Kista (SE)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 101 days.

(21) Appl. No.: 17/547,463

(22) Filed: Dec. 10, 2021

(65) Prior Publication Data

US 2022/0103094 A1 Mar. 31, 2022

Related U.S. Application Data

(63) Continuation of application No. PCT/EP2020/061515, filed on Apr. 24, 2020.

(51) Int. Cl.
*H02M 7/81* (2006.01)
*B60L 53/20* (2019.01)
(Continued)

(52) U.S. Cl.
CPC ............... *H02M 7/81* (2013.01); *B60L 53/20* (2019.02); *H02M 1/42* (2013.01); *H02M 1/44* (2013.01)

(58) Field of Classification Search
CPC ............ H02M 7/08; H02M 1/42; H02M 1/44; H02M 7/04; H02M 7/043; H02M 7/12;
(Continued)

(56) References Cited

U.S. PATENT DOCUMENTS 8,432,138 B2 * 4/2013 Chen .................. H02M 1/4233
363/125
9,001,537 B2 * 4/2015 Jin ...................... H02M 1/4233
363/53
(Continued)

FOREIGN PATENT DOCUMENTS

CN 110112903 A 8/2019
CN 110198119 A 9/2019
(Continued)

OTHER PUBLICATIONS

Bin Su et al., "An Interleaved Totem-Pole Boost Bridgeless Rectifier With Reduced Reverse-Recovery Problems For Power Factor Correction", IEEE Transactions on Power Electronics, vol. 25, No. 6, Jun. 2010,total 10 pages.
(Continued)

*Primary Examiner* — Gary L Laxton
(74) *Attorney, Agent, or Firm* — WOMBLE BOND DICKINSON (US) LLP

(57) ABSTRACT

A power conversion apparatus employs multi-level techniques and wide band-gap semiconductor switching devices to achieve high efficiency in a converter system having high power density. The apparatus may be configured as a bi-directional conversion system capable of operating as both an inverter, configured to receive DC power and produce AC power, and as a rectifier configured to receive AC power and produce DC power. The apparatus is especially suitable for electric vehicle (EV) applications.

16 Claims, 15 Drawing Sheets

(51) Int. Cl.
*H02M 1/42* (2007.01)
*H02M 1/44* (2007.01)

(58) Field of Classification Search
CPC .. H02M 7/155; H02M 7/1552; H02M 7/1555; H02M 7/1557; H02M 7/162; H02M 7/1623; H02M 7/1626
See application file for complete search history.

(56) References Cited

U.S. PATENT DOCUMENTS

| | | | |
|---|---|---|---|
| 11,769,981 B1* | 9/2023 | O'Loughlin | H01S 3/0941 372/38.02 |
| 2011/0037444 A1* | 2/2011 | Wildash | H02M 1/4225 323/210 |
| 2013/0002214 A1* | 1/2013 | Chiu | H02M 3/1584 323/271 |
| 2013/0003427 A1* | 1/2013 | Pan | H02M 1/4208 363/44 |
| 2015/0372615 A1 | 12/2015 | Ayyanar | |
| 2017/0294833 A1* | 10/2017 | Yang | H01F 27/2804 |
| 2020/0292161 A1* | 9/2020 | Majewski | H02M 7/06 |
| 2021/0304958 A1* | 9/2021 | Yu | H02M 1/4216 |
| 2022/0077769 A1 | 3/2022 | Cai et al. | |

FOREIGN PATENT DOCUMENTS

| | | |
|---|---|---|
| EP | 2381568 A2 | 10/2011 |
| WO | 2006137744 A1 | 12/2006 |
| WO | 2018141283 A1 | 8/2018 |

OTHER PUBLICATIONS

Jih-Sheng Lai and Fang Zheng Peng, Multilevel Converters—A New Breed of Power Converters , IEEE Transactions on Industry Applications, vol. 32, No. 3, May/Jun. 1996,total 9 pages.

Shuo Liu et al., "A Novel Single-Phase Bidirectional Electric-Drive-Reconstructed Onboard Converter for Electric Vehicles",Digital Object Identifier 10.1109/ACCESS.2020.2970201,IEEE Access,Mar. 13, 2020,total 9 pages.

Pouria Qashqai; Abdolreza Sheikholeslami; Hani Vahedi; Kamal Al-Haddad, A Review on Multilevel Converter Topologies for Electric Transportation Applications , IEEE Vehicle Power and Propulsion Conference (VPPC) 2015, total 6 pages.

Jo o Paulo M. Figueiredo et al.,"A Review of Single-Phase PFC Topologies Based on The Boost Converter",2010 9th IEEE/IAS International Conference on Industry Applications, INDUSCON 2010 ,total 6 pages.

Liang Zhou and Yi Feng Wu, 99% Efficiency True-Bridgeless Totem-Pole PFC Based on GaN HEMTs , IEEE Applied Power Electronics Conference and Exposition (APEC); 2016,total 9 pages.

Yuchen Yang et al., "Multi-phase Coupled and Integrated Inductors for Critical Conduction Mode Totem-Pole PFC Converter",2017 IEEE,total 6 pages.

Tatsuo Morita, Hiroyuki Handa, Shinji Ujita, Masahiro Ishida, Tetsuzo Ueda 99.3% Efficiency of Boost-up Converter for Totem-pole Bridgeless PFC Using GaN Gate Injection Transistors , PCIM Europe 2014,total 5 pages.

Ortmann M S et al: "Concepts for high efficiency single-phase three-level PWM rectifiers", Energy Conversion Congress and Exposition, 2009. ECCE.IEEE, IEEE, Piscataway, NJ, USA, Sep. 20, 2009, XP031887789, 8 pages.

* cited by examiner

BRIDGELESS SINGLE-PHASE PFC MULTI-LEVEL TOTEM-POLE POWER CONVERTER

CROSS-REFERENCE TO RELATED APPLICATIONS

This application is a continuation of International Application No. PCT/EP2020/061515, filed on Apr. 24, 2020, the disclosure of which is hereby incorporated by reference in its entirety.

TECHNICAL FIELD

The aspects of the disclosed embodiments relate generally to power electronics and more particularly to switch-mode power converters.

BACKGROUND

Current trends in power converters, both alternating current (AC) to direct current (DC) and DC to AC converters, are toward high efficiency and high power density. Many of the current issues with such power converters can be solved with use of modern wide band-gap switching devices. High efficiency may be achieved with an increased number of semiconductor devices, improved magnetic components, and reduced switching frequencies. However, these approaches introduce additional issues such as decreasing the power density of the converter.

Switching frequencies in power converters may be increased through the use of bridgeless totem-pole topologies. However increasing power conversion levels limits the availability of semiconductor devices capable of handling the higher current rates these topologies require. Paralleling of switching devices in a converter can reduce the required current rates but can lead to unbalanced currents. These approaches also do little to increase power density or reduce the size and weight of the converter.

Multi-level converter techniques, which employ series-connected switching cells to provide an increased number of voltage levels, enable low current ripple and a reduction of filtering elements at a cost of increased number and increased current capability in the semiconductor switches. Conventional totem-pole converter topologies include only a single high frequency switching cell resulting in three voltage levels, which does little to reduce current ripple or reduce voltages applied to various converter components.

Thus, there is a need for improved power conversion apparatus having high efficiency, high power density, and low electromagnetic interference (EMI). Accordingly, it would be desirable to provide a power converter apparatus that addresses at least some of the problems described above.

SUMMARY

The aspects of the disclosed embodiments are directed to a power converter topology suitable for high power, high efficiency, and high power density applications. It is an objective of the disclosed embodiments to provide a power converter topology that provides lower total harmonic distortion (THD) of the input current and higher power factor (PF) for both AC to DC and DC to AC modes of operation. This and other objectives are addressed by the subject matter of the independent claims. Further advantageous modifications can be found in the dependent claims.

According to a first aspect the above and further objectives and advantages are obtained by an apparatus. In one embodiment, the apparatus includes a plurality of high frequency switching cells. A first high frequency switching cell is connected in parallel with at least one other high frequency switching cell. The apparatus includes a plurality of inductors, wherein at least one inductor of the plurality of inductors is magnetically coupled to at least one other inductor of the plurality of inductors. The plurality of inductors is configured to inductively couple a common connection point on an input side with at least a first connection point connected to a midpoint of the first high frequency switching cell and a at least a second connection point connected to a midpoint of the at least one other high frequency switching cell. The apparatus further includes a boost inductor. A first end of the boost inductor is coupled to a first AC voltage. A second end of the boost inductor is coupled to the common connection point on the input side of the plurality of inductors. The apparatus further includes a low frequency switching cell connected in parallel with the plurality of high frequency switching cells. A midpoint of the low frequency switching cell is coupled to a second AC voltage. The power converter or conversion apparatus of the disclosed embodiments provides power conversion with increased efficiency and improved power density.

In an embodiment, the first high frequency switching cell includes a first high frequency switching device connected between a first DC voltage and the midpoint of the first high frequency switching cell, and a second high frequency switching device connected between the midpoint of the first high frequency switching cell and a second DC voltage. The totem-pole switch arrangement allows pulse-width modulation (PWM) control of the output power.

In an embodiment, the at least one other high frequency switching cell includes a first high frequency switching device coupled between the first DC voltage and the midpoint of the at least one other high frequency switching cell and a second high frequency switching device connected between the midpoint of the at least one other high frequency switching cell and the second DC voltage. Using the same switching cell configuration in all of the high frequency switching cells of the converter apparatus promotes current sharing and simplifies the controller structure.

In an embodiment, the common connection point on the input side of the plurality of inductors is coupled to the at least one first connection point through a first inductor of the plurality of inductors and the common connection point is coupled to the at least one second connection point through a second inductor of the plurality of inductors. Magnetic coupling between the inductors promotes current sharing and allows multi-level operation of the apparatus.

In an embodiment, the first inductor is coupled to the second inductor with an opposing magnetic coupling. Autotransformers provide opposing magnetic coupling and have the advantage of smaller size in certain embodiments.

In an embodiment, the first inductor is coupled to the second inductor with an aiding magnetic coupling. Aiding magnetic coupling can be advantageous in embodiments where the plurality of inductors includes an odd number of inductors, such as three inductors.

In an embodiment, the plurality of inductors comprises one or more auto-transformers connected together in a tree configuration. Tree configurations can make use of smaller size autotransformers, which can yield higher power densities.

In an embodiment, the apparatus includes a filter coupled between the low frequency switching cell and the DC power.

The filter can be can be configured to remove unwanted frequency components and improve the quality of the DC power. This is especially important when the apparatus is operated as an AC to DC converter.

In an embodiment, the apparatus includes a filter connected between the AC input power and the boost inductor. The filter can be an electromagnetic interference (EMI) filter. Including an EMI filter between the AC input power and the boost inductor can help reduce EMI emissions.

In an embodiment, the apparatus is a multi-level power conversion apparatus.

In an embodiment, the apparatus includes a controller configured to generate a plurality of pulse wave modulation (PWM) signals based on a control voltage and a plurality of triangle voltage signals. Each triangle voltage signal of the plurality of triangle voltage signals is shifted equally in phase based on the number of high frequency switching cells in the plurality of high frequency switching cells. Using phase shifted triangle voltage signals to generate the PWM signals provides a very simple control structure for the apparatus. This control structure allows the power converter to achieve lower THD and high PF.

In an embodiment, the plurality of high frequency switching cells is coupled in parallel with a DC power and wherein the apparatus is configured to receive an AC power and produce the DC power. AC to DC power conversion is useful for example when charging batteries from a local power grid.

In an embodiment, the apparatus is configured to receive DC power and produce the AC power. Including both AC to DC as well as DC to AC power conversion in the same power conversion apparatus is especially useful in electric vehicle (EV) applications.

In an embodiment, the plurality of high frequency switching cells comprise gallium-nitride switching devices. Wide band-gap semiconductor switches such as gallium-nitride switching devices are well suited for use in hard-switching totem-pole power converter applications.

In an embodiment, the controller is configured to generate the control voltage based on at least one of a voltage of an AC power and a current flowing through the boost inductor, and to generate a plurality of PWM switch control signals (PWMH1, PWML1, PWMH2, PWML2, PWMHj, PWMLj) configured to drive the plurality of high frequency switching cells. Generating a plurality of PWM control signals from a single control voltage simplifies a structure of the controller.

According to a second aspect the above and further objectives and advantages are obtained by a method. In one embodiment, the method includes receiving an AC power at a boost inductor and transferring the AC power via the boost inductor to a plurality of inductors. At least one inductor of the plurality of inductors is magnetically coupled to at least one other inductor of the plurality of inductors. AC power is distributed to a midpoint of a plurality of high frequency switching cells. Each high frequency switching cell in the plurality of high frequency switching cells includes a midpoint between the switching devices of the cell and is coupled in parallel with a DC power. AC power is transferred to the DC power by controlling the plurality of high frequency switching cells with a plurality of PWM switch control signals. DC power is returned to the AC power through a low frequency switching cell. A switching frequency of the low frequency switching cell is synchronized with a primary frequency of the AC power. The aspects of the disclosed embodiments provide power conversion with increased efficiency and improved power density.

In an embodiment, the method further includes generating a plurality of PWM control signals, where each PWM control signal in the plurality of PWM control signals is shifted equally in phase based on a number of high frequency switching cells in the number of high frequency switching cells. Shifting the control signals equally in phase yields significant reductions in EMI and reduces voltage stresses on the boost inductor thereby enabling reduced component sizes and increases in the overall power density of the converter.

In an embodiment, the method further includes receiving the DC power and producing the AC power. Providing power inversion as well as power rectification is especially advantageous in certain applications.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the disclosure, the disclosure will be explained in more detail with reference to the example embodiments shown in the drawings, in which like numerals indicate like elements and.

DETAILED DESCRIPTION OF THE DISCLOSED EMBODIMENTS

Figure 1:
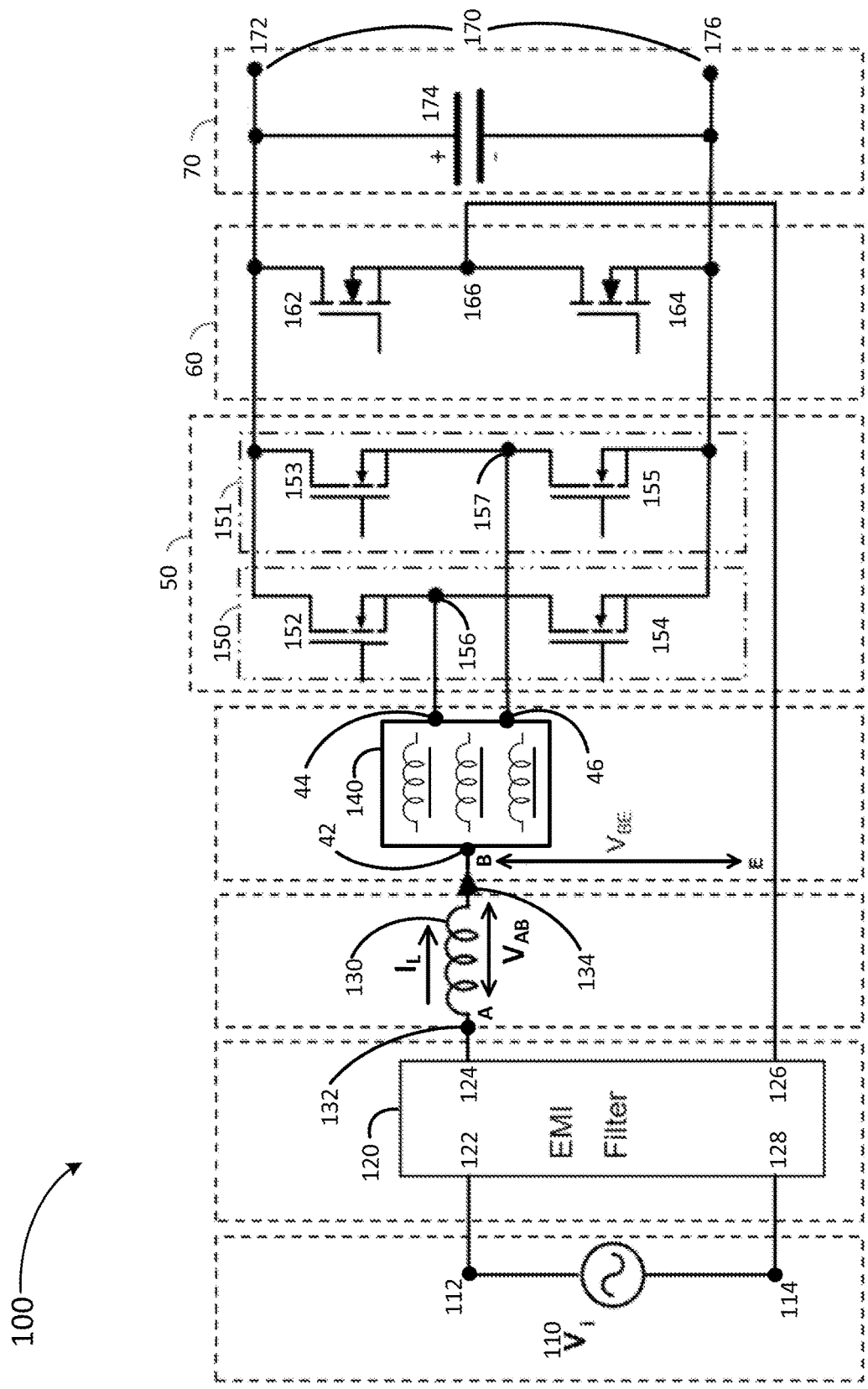
FIG. 1 illustrates a schematic block diagram of an exemplary power conversion apparatus incorporating aspects of the disclosed embodiments.

Referring to FIG. 1, a schematic block diagram of an exemplary power conversion apparatus 100 incorporating aspects of the disclosed embodiments is illustrated. The power conversion apparatus 100 of the disclosed embodiments is directed to a power converter topology, also referred to herein as a bridgeless single-phase power factor correction (PFC) multi-level totem-pole power converter. The apparatus 100 employs multi-level techniques and wide band-gap semiconductor switching devices to achieve high efficiency in a converter system having high power density. The exemplary apparatus 100 may be configured as a bi-directional conversion system capable of operating as both an inverter, configured to receive DC power and produce AC power, and as a rectifier configured to receive AC power and produce DC power. The apparatus 100 is especially suitable for electric vehicle (EV) applications.

The exemplary power conversion apparatus 100 illustrates a power converter topology that provides lower total harmonic distortion (THD) of the input current and higher power factor (PF) for both AC to DC and DC to AC modes of operation. Lower THD refers to a THD lower than about three percent (3%), and a higher PF refers to a PF close to one.

As shown in FIG. 1, the apparatus 100 includes a plurality of high frequency switching cells 50. A first high frequency switching cell 150 is connected in parallel with at least one other high frequency switching cell 151. Each switching cell 150, 151 is connected in parallel between a positive DC voltage 172 and a negative DC voltage 176. Although only two high frequency switching cells 150, 151 are illustrated in FIG. 1, it will be understood that the plurality of high frequency switching cells 50 may include any number of two or more high frequency switching cells without straying from the spirit and scope of the disclosed embodiments.

The apparatus 100 includes a plurality of inductors 140. At least one inductor of the plurality of inductors 140 is magnetically coupled to at least one other inductor of the plurality of inductors 140. The plurality of inductors 140 is configured to inductively couple a common connection point 42 on an input side of the power converter 100 with at least a first connection point 44 and at least a second connection point 46 connected to the plurality of high frequency switching cells.

As illustrated in FIG. 1, midpoint 156 of the first high frequency switching cell 150 is connected to the at least one first connection point 44. A midpoint 157 of the at least one other high frequency switching cell 151 is connected to the at least one second connection point 46.

The apparatus 100 includes a boost inductor 130. A first end 132 of a boost inductor 130 is coupled to a first AC voltage 112 and a second end 134 of the boost inductor 130 is coupled to the common connection point 42 that is connected to the plurality of inductors 140.

A low frequency switching cell 60 is connected in parallel with the plurality of high frequency switching cells 50. A midpoint 166 of the low frequency switching cell 60 is coupled to a second AC voltage 114.

As will be discussed further below, in certain embodiments it is beneficial to include an input filter 120, such as an EMI filter, on an input side of the power conversion apparatus 100. The input filter 120 is configured to reduce EMI emissions. In the example of FIG. 1, an EMI filter 120 is coupled between the AC voltage 110 and the first end 132 of the boost inductor 130 and the midpoint 166 of the low frequency switching cell 60.

In one embodiment, each high frequency switching cell in the plurality of high frequency switching cells 50, such as high frequency switching cell 150, includes a first high frequency switching device 152 connected between the first DC voltage 172 and the midpoint 156 of the first high frequency switching cell 150, and a second high frequency switching device 154 connected between the midpoint 156 of the first high frequency switching cell 150 and a second DC voltage 176. All high frequency switching cells 150, 151, in the plurality of high frequency switching cells 50 are similarly configured to have two high frequency switching devices, 152, 154, and 153, 155, respectively, connected in a totem-pole fashion. Midpoint 156 connects switching devices 152 and 154, while midpoint 157 connects switching devices 153 and 155, as illustrated in FIG. 1.

Wide band-gap semiconductor switching devices may be advantageously used as the high frequency switching devices 152, 154, 153, 155 in the plurality of high frequency switching cells 50. Important aspects to be taken into consideration for reduction of semiconductor losses in hard-switching power converters include the energy stored in the output capacitance, the reverse recovery characteristic of the anti-parallel diode of the switch, and the switching frequency. All these considerations are addressed with the use of modern wide band-gap devices, such as Gallium Nitride (GaN) and Silicon Carbide (SiC) semiconductor switching devices.

As used herein the term "rectification" refers to converting AC power to DC power and the term "inversion" refers to converting DC power to AC power. In the exemplary apparatus 100 of FIG. 1, rectification and inversion are provided by a low frequency switching cell 60 connected across the positive DC voltage 172 and the negative DC voltage 176. The low frequency switching cell 60 is also connected in parallel with the plurality of high frequency switching cells 50. In certain embodiments, operation of the low frequency switching cell 60 is synchronized with a frequency of the AC power 110 thereby providing bi-directional rectification or inversion functionality of the power conversion apparatus 100. The low frequency switching cell 60 may, for example, be advantageously synchronized with the 60 hertz frequency of the North American grid power or with the 50 hertz frequency of the European grid power.

As illustrated in FIG. 1, the low frequency switching cell 60 in this embodiment includes a first low frequency switching device 162 coupled between a midpoint connection 166 and the positive DC voltage 172, and a second low frequency switching device 164 coupled between the midpoint connection 166 and the negative DC voltage 176. The midpoint connection 166 between the switching device 162 and switching device 164 is connected to a second AC voltage 114. The switching devices 162, 164 used in the low frequency switching cell 60 may beneficially be implemented using low cost silicon (Si) semiconductor devices.

In the example of FIG. 1, apparatus 100 incorporates a plurality of inductors 140 on the input side of the power conversion apparatus 100 between the boost inductor 130 and the plurality of high frequency switching cells 50. As shown in FIG. 1, the plurality of inductors 140 are configured to couple a second end 134 of the boost inductor 130 with the midpoint connections 156, 157 of the plurality of high frequency switching cells 50. As will be discussed in more detail below the plurality of inductors 140 includes two or more inductors or inductive elements configured to inductively couple a common connection point 42 on one side of the plurality of inductors with two or more connection points 44, 46 on an other side of the plurality of inductors.

Each inductor in the plurality of inductors 140 may be magnetically coupled to one or more other inductors in the plurality of inductors. The common connection point 42 is connected to the second end 134 of the boost inductor 130, and each of the connection points 44, 46 is connected to a respective midpoint connection 156, 157 of the plurality of high frequency cells 50.

For example, in one embodiment, the first connection point 44 is connected to the midpoint 156 of the first high frequency switching cell 150, and the second connection point 46 is connected to the midpoint 157 of the second high frequency switching cell 151. The exemplary apparatus 100 employs a one to one correspondence between connection points 44, 46 and a number of the high frequency switching cells 150, 151. Each connection point 44, 46 is respectively connected to a single midpoint 156, 256 of a corresponding high frequency switching cell 150, 151. Each midpoint connection 156, 157 is connected to a respective connection point 44, 46.

The exemplary power converter apparatus 100 is configured to transfer electrical energy between the AC power 110 and the DC power 170 through the boost inductor 130. The boost inductor 130 is configured to store energy during a first switching state and discharges the stored energy during a subsequent switching state. A first end 132 of the boost inductor 130 is coupled to the first AC voltage 112 and a second end 134 of the boost inductor 130 is connected to the common connection point 42 that is connected to the plurality of inductors 140. In this manner, boost inductor 130 transfers energy between the AC power 110 and the plurality of inductors 140.

Many jurisdictions impose restrictions on the amount of electromagnetic interference (EMI) or radio frequency interference (RMI) that may be emitted by electronic equipment. To stay below these EMI requirements certain embodiments of the exemplary apparatus 100 may include an EMI filter 120. As is shown in FIG. 1, a first side of the EMI filter 120, which includes connection points 122, 128, is connected to the AC power 110. A second side of the EMI filter 120, which includes connection points 124, 126, is connected to the boost inductor 132 and to the midpoint connection 166 of the low frequency switching cell 60. The EMI filter 120 is beneficially configured to reduce the amount or magnitude of EMI emitted by the apparatus 100.

In certain embodiments it is beneficial to include an output filter 70, at an output of the low frequency switching cell 60, to remove unwanted frequency components from the DC power 170. As shown in FIG. 1, the output filter 70 is coupled between the low frequency switching cell 60 and the DC output power 170. In the example of FIG. 1, the output filter 70 comprises a capacitor 174 coupled in parallel with the low frequency switching cell 60 and the DC power 170. The output filter 70 can comprise any suitable type of filter, such as an electronic filter, with elements configured to remove unwanted frequency components from the DC output power 170.

Paralleling of the high frequency switching cells 150, 151 and coupling of the magnetic components, yields a highly efficient power conversion apparatus 100. The converter topology illustrated in FIG. 1 creates a bridgeless single-phase multi-level totem-pole power converter 100 configured to reduce current stress on the switching devices and reduce voltage stress on the magnetic components. The parallel connection of switching cells 150. 151 illustrated in FIG. 1 also contributes to higher efficiency by reducing the total equivalent resistance of the system.

Power density of power conversion apparatus depends mainly on capacitor, inductor, and transformer sizes. The multi-level capabilities of apparatus 100 enables the high frequency switching cells 50 to operate at higher switching frequencies, for example above 20 kilohertz, thereby avoiding the need for bulky capacitors, inductors, or transformers.

Figure 2:
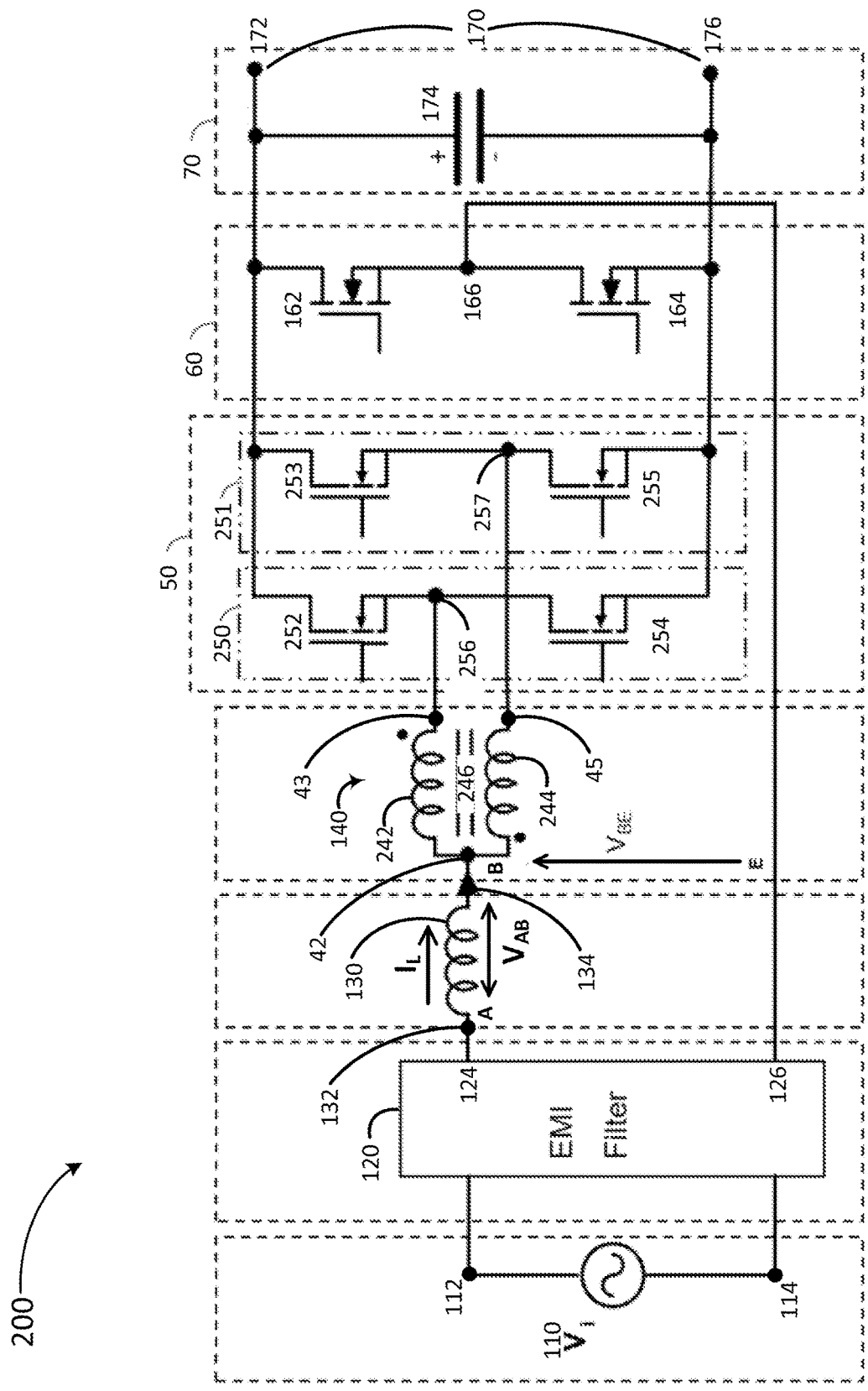
FIG. 2 illustrates a schematic diagram of an exemplary power conversion apparatus incorporating aspects of the disclosed embodiments having two high frequency switching cells.

Referring to FIG. 2 there can be seen a schematic diagram of an exemplary power conversion apparatus 200 incorporating aspects of the disclosed embodiments. The exemplary apparatus 200 depicts an alternate implementation of the exemplary apparatus 100 described above with reference to FIG. 1. FIG. 1 and FIG. 2 depict similar power conversion apparatus with like numerals representing like elements.

In the embodiment illustrated in FIG. 2, the plurality of inductors 140 includes an autotransformer 246 with a central tap coupled to the common connection point 42 and each end of the autotransformer 246 winding coupled to a respective connection point 43, 45. Each of the connection points 43, 45 is connected to a respective midpoint 256, 257 in the plurality of high frequency switching cells 50. The exemplary apparatus 200 shown in FIG. 2 includes two high frequency switching cells 250, 251.

As used herein the term "autotransformer" refers to a type of electrical transformer having a single winding with a central tap. In the exemplary embodiment illustrated in FIG. 2, the central tap is connected to connection point 42. Both inductive elements or inductors 242, 244 of the autotransformer 246 include an equal number of windings or turns thereby creating a turns ratio of 1:1 between the two windings or inductors 242, 244. In certain embodiments is may be desirable to configure the central tap such that each inductor 242, 244 includes a different number of turns thereby creating an unbalanced turn ratio between the two inductors 242, 244. The two inductive elements 242, 244 of the autotransformer are magnetically coupled with a coupling factor close to unity.

In the embodiment illustrated in FIG. 2, the autotransformer 246 is configured to provide two inductors 242, 244. Because both inductors 242, 244 are formed by opposite ends of a single autotransformer winding, current flowing from the connection point 42 connected to the central tap, to each of the connection points 43, 45, will generate opposing magnetic fields within each inductor 242, 244. Magnetically coupled inductors, such as the inductors 242, 244, which generate opposing magnetic fields when positive current is applied to each, are referred to herein as having an opposing magnetic coupling. Conversely, magnetically coupled inductors wound in the same direction will generate complementary magnetic fields when positive current is applied to each. Magnetically coupled inductors generating complementary or aiding magnetic fields are referred to herein as having an aiding magnetic coupling.

As used herein the term "multi-level power converter" is used to describe a power converter that synthesizes high-voltage multi-level waveforms using lower voltage components. When coupled to the boost inductor 130 through an autotransformer 246 and operated appropriately, the two high frequency switching cells 250, 251 working in concert with the low frequency switching cell 60 are configured to synthesize two positive and two negative voltage levels. As will be discussed further below, the exemplary apparatus 200 is configured to produce a primary voltage signal $V_{BE}$ having five distinct voltage levels with a fundamental frequency equal to the AC power 110. The term "primary voltage signal" as used herein refers to the voltage signal generated at the second end 134 of the boost inductor 130 and labelled as $V_{BE}$.

Figure 3:
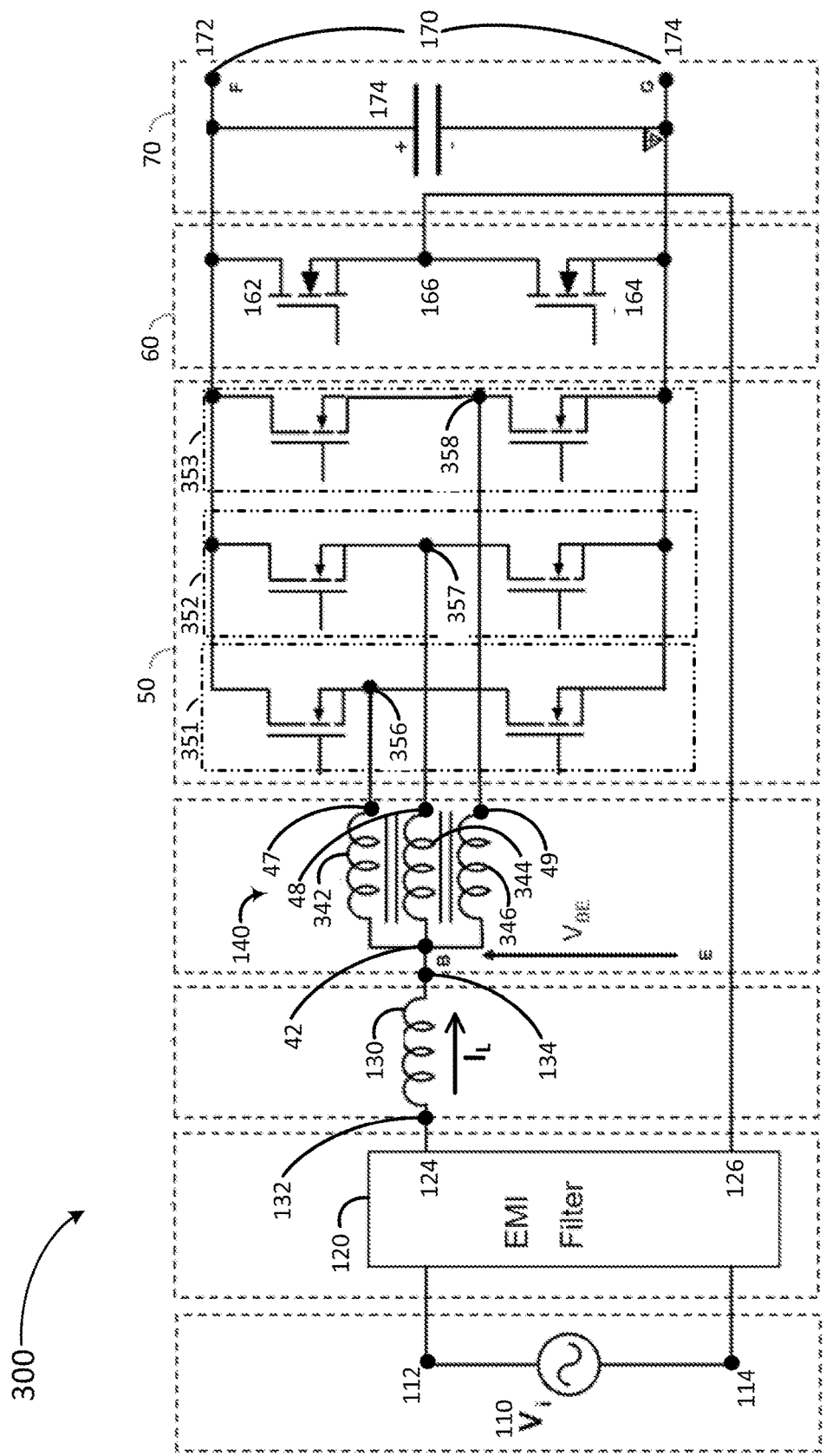
FIG. 3 illustrates a schematic diagram of an exemplary power conversion apparatus incorporating aspects of the disclosed embodiments having three high frequency switching cells.

FIG. 3 illustrates a power conversion apparatus 300 incorporating aspects of the disclosed embodiments having three high frequency switching cells 351, 352, 353. The apparatus 300 represents an alternate embodiment of the apparatus 100 described above with reference to FIG. 1, where like numerals represent like elements.

In the example of FIG. 3, the plurality of inductors 140 includes three magnetically coupled inductors 342, 344, 346 configured to inductively couple the common connection point 42 of the plurality of inductors 40 with three connection points 47, 48, 49. As shown in FIG. 3, each connection point 47, 48, 49 is coupled to the common connection point 42 through an individual one inductor 342, 344, 346. Each connection point 47, 48, 49 is also connected to a respective one midpoint 356, 357, 358 of the plurality of high frequency switching cells 50.

In the illustrated apparatus 300 all three inductors 342, 344, 346 are coupled with aiding magnetic coupling. Alternatively, one of the inductors 342 may be magnetically coupled in opposition to a second one of the inductors 344.

Figure 4:
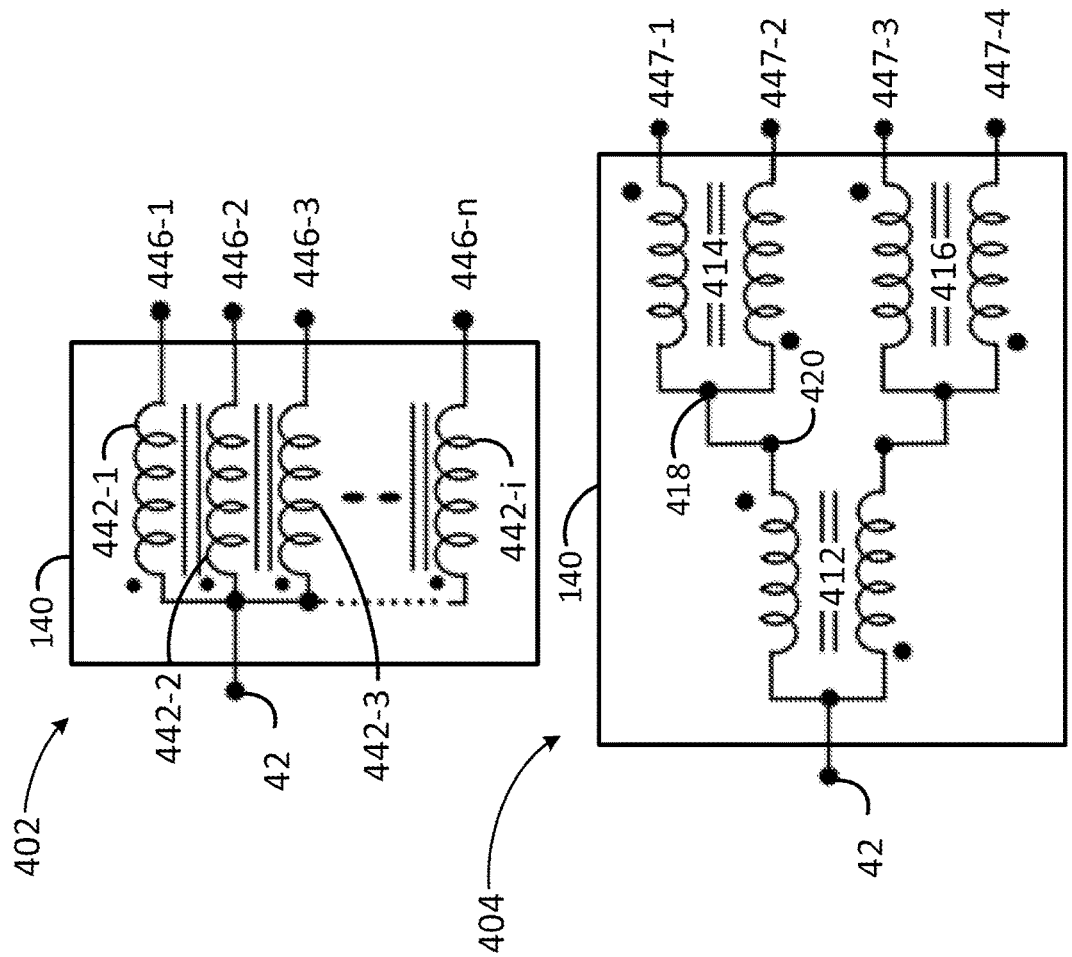
FIG. 4 illustrates schematic diagrams showing alternative inductor configurations for an apparatus incorporating aspects of the disclosed embodiments.

FIG. 4 illustrates schematic diagrams showing two alternate inductive network configurations 402, 404 of the plurality of inductors 140 for an apparatus 100 incorporating aspects of the disclosed embodiments. Those skilled in the art will readily recognize that any suitable configuration of a plurality of inductors that inductively couples a common connection point 42 with a plurality of connection points 446-1, 446-2, . . . 446-n, as shown in FIG. 4, may be advantageously employed without straying from the spirit and scope of the disclosure.

In FIG. 4, the first exemplary inductive network 402 includes a plurality of magnetically coupled inductors 140 labeled as inductor 442-1, 442-2, 442-3 . . . 442-n. The individual inductors 442-1, 442-2, 442-3 . . . 442-n are connected between respective connection points 446-1, 446-2 . . . 446-n and the common connection point 42. In the network 402 the plurality of inductors 140 are all magnetically coupled with an aiding magnetic coupling. Alternatively, one or more of the inductors 442-1, 442-2, 442-3 . . . 442-n may be magnetically coupled in opposition to another inductor 442-1, 442-2, 442-3 . . . 442-n. In certain embodiments it may be advantageous to have one inductor in the plurality of inductors 140 magnetically coupled to less than all of the other inductors in the plurality of inductors 140.

The inductive network 404 illustrates the use of autotransformers 412, 424, 416 connected in a tree configuration. In the exemplary inductive network 404 three autotransformers 412, 414, 416 are connected in a tree configuration and used to couple the common connection point 42 to four connection points 447-1, 447-2, 447-3, 447-4, in this example. The term "tree configuration" as used herein refers to a set of autotransformers where the center tap 418 of one autotransformer 414 is connected to an end 420 of the winding of an other autotransformer 412 in the plurality of inductors 140. Additional autotransformers (not shown) may be added to the tree configuration of the inductive network 404 when additional switch connection points (not shown) are desired. In its simplest form the term tree configuration may be applied to a plurality of inductors that includes only a single autotransformer connected as described above and with reference to apparatus 200. In certain embodiments a plurality of inductors 140 employing autotransformers 404 may yield a smaller size than the plurality of magnetically coupled inductors of the inductive network 402.

Figure 5:
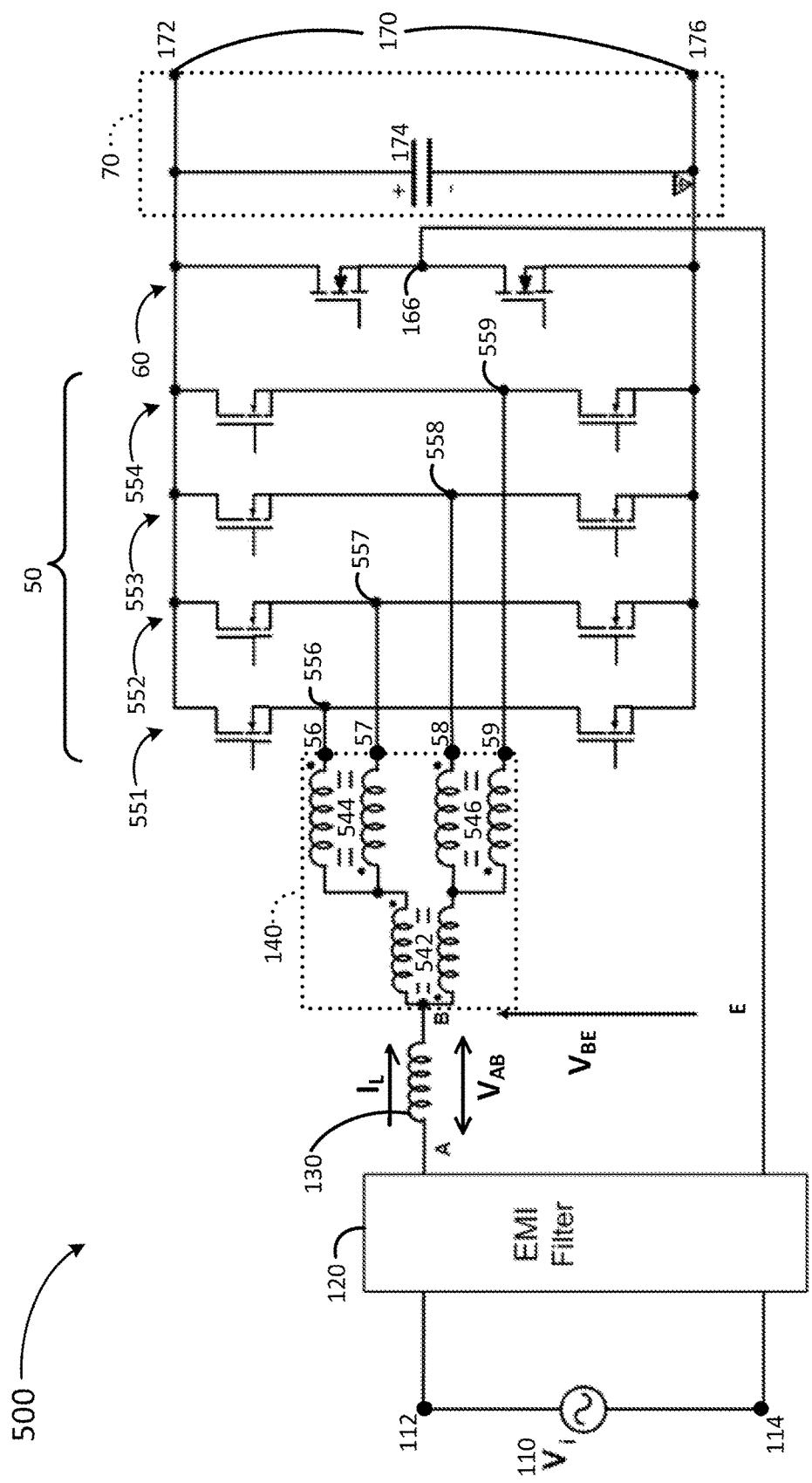
FIG. 5 illustrates a schematic diagram of an exemplary power conversion apparatus incorporating aspects of the disclosed embodiments having three autotransformers.

FIG. 5 illustrates a schematic diagram of an exemplary power conversion apparatus 500 incorporating aspects of the disclosed embodiments having three connected autotransformers 542, 544, 546. In the exemplary apparatus 500 the three autotransformers 542, 544, 546 are coupled in a tree configuration where the center tap of a first autotransformer 542 forms the common connection point 42 and the winding ends of two other autotransformers 544, 546 forms four respective connection points 56, 57, 58, 59.

The exemplary apparatus 500 includes four high frequency switching cells 551, 552, 553, 554. The high frequency switching cells 551, 552, 553, 554 are coupled in parallel with the DC power 170 and the midpoint 556, 557, 558, 559 of each high frequency switching cell 551, 552, 553, 554 is connected to a corresponding switch connection point 56, 57, 58, 59 of the plurality of inductors 140. Combining four high frequency switching cells 551, 552, 553, 554 with the tree connected autotransformers 542, 544, 546 as illustrated in FIG. 5 allows the exemplary apparatus 500 to be operated as a multi-level converter having nine voltage levels.

Figure 6:
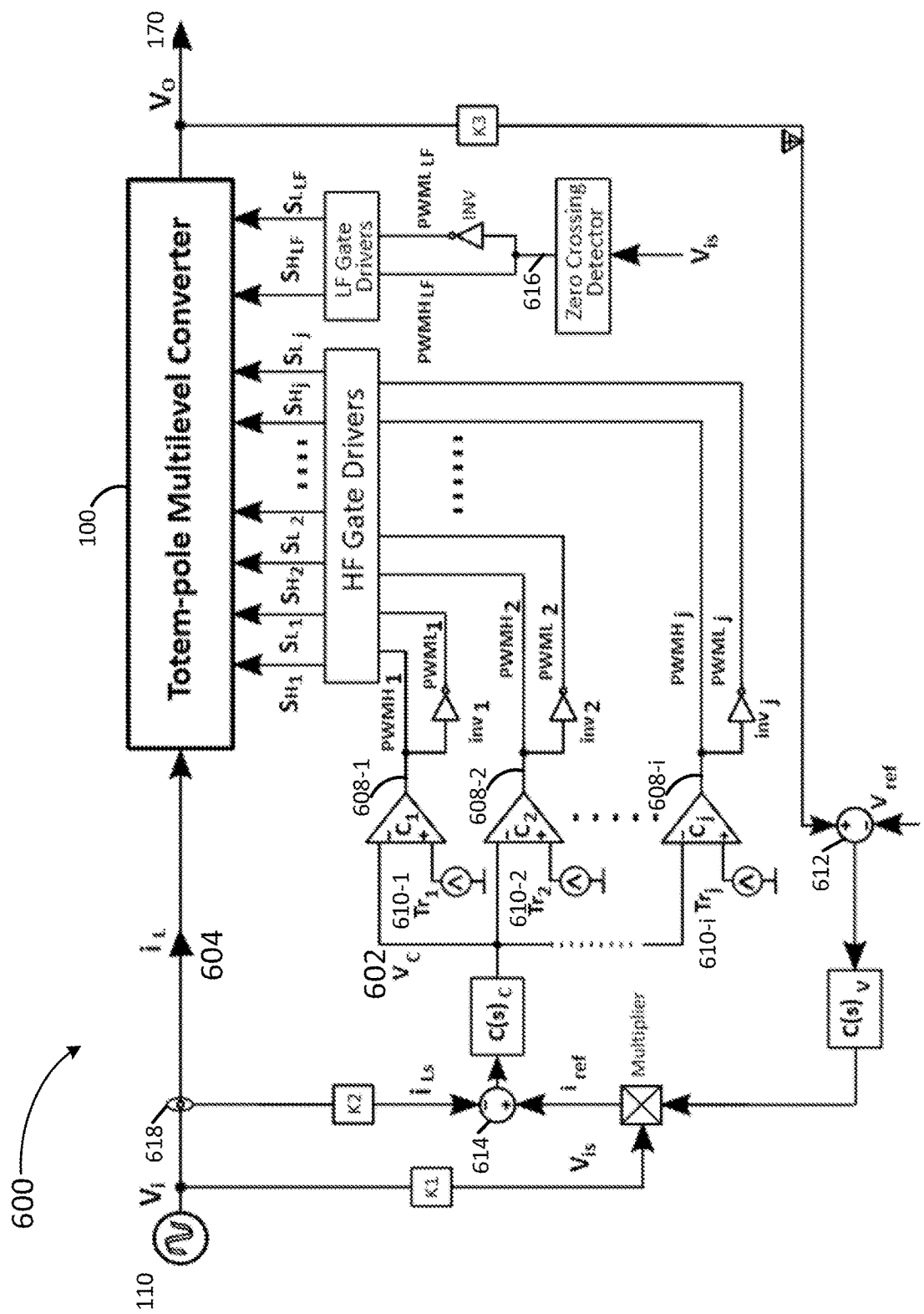
FIG. 6 illustrates a block diagram of an exemplary controller for a power conversion apparatus incorporating aspects of the disclosed embodiments.

Referring to FIG. 6 there can be seen an exemplary controller 600 for a power converter apparatus 100 incorporating aspects of the disclosed embodiments. The exemplary controller 600 is configured to control operation of the apparatus 100 by generating high frequency switch control signals $S_{H1}, S_{L1}, S_{H2}, S_{L2} \ldots S_{Hj}, S_{Lj}$ and low frequency switch control signals $S_{H1f}, S_{L1f}$ for driving the switching cells 50, 60 in the exemplary apparatus 100 described above and with reference to FIG. 1. The exemplary controller 600 can be used to control any n-level converter, such as the power converter apparatus 100, having j high frequency switching cells 50, where j is the number of high frequency switching cells in the plurality of high frequency switching cells 50, and n is the number of voltage levels of the primary voltage signal $V_{BE}$. The exemplary controller 600 is configured to synthesize a number of voltage levels n, where n=2j+1.

The exemplary controller 600 is configured to operate the apparatus 100 in an AC to DC converter mode which receives an AC power 110 and produces a DC power 170.

Alternatively, similar controller techniques may be advantageously employed to operate the apparatus 100 in an inverter mode to receive the DC power 170 and produce the AC power 110.

The exemplary controller 600 employs an average current control mode to shape the input current 604 into a sinusoidal waveform. The controller 600 includes two control loops: an outer voltage regulator loop $C(s)_v$ and an inner current regulator loop $C(s)_c$. The outer voltage regulator loop $C(s)_v$ compares 612 a voltage $V_o$ of the DC power 170 to a reference voltage $V_{ref}$ and produces a current reference signal $i_{ref}$. The current reference signal ha is then compared 614 to the AC input current $i_L$ to produce 602 a control voltage $V_c$.

A pulse width modulation (PWM) method is used by the controller 600 to generate the high frequency switch control signals $S_{H1}, S_{L1}, S_{H2}, S_{L2} \ldots SH_j, S_{Lj}$. The high frequency switch control signals are used to drive the gates of the semiconductor switches in the plurality of high frequency switching cells.

The control voltage $V_c$ 602 is compared to a set of triangle voltage signals 610-1, 610-2 . . . 610-$j$ to produce a set of PWM signals 608-1, 608-2, 608-$j$. The set of PWM signals 608-1, 608-2, 608-$j$ are then inverted $inv_1, inv_2 \ldots inv_j$ to generate high frequency switch logic signals $PWMH_1$, $PWML_1, PWMH_2, PWML_2 \ldots PWMH_j, PWML_j$ and conditioned by suitable Gate Drivers to produce the high frequency switch control signals $S_{H1}, S_{L1}, S_{H2}, S_{L2} \ldots S_{Hj}$, $S_{Lj}$. The low side switch control signals $S_{L1}, S_{L2} \ldots S_{Lj}$ are complementary to the high side switch control signals $S_{H1}$, $S_{H2}, \ldots S_{Hj}$ and are created by inverting $inv_1, inv_2 \ldots inv_j$ and subsequently conditioning the high side switch logic signals $PWMH_1, PWMH_2 \ldots PWMH_j$. The illustrated exemplary controller 600 is configured for AC to DC operation. Configuring the exemplary controller 600 for DC to AC operation may be achieved by inverting the high frequency switch logic signals $PWMH_1, PWML_1, PWMH_2$, $PWML_2 \ldots PWMH_j, PWML_j$.

Low frequency switch control signals $S_{H1f}, S_{L1f}$ are generated by applying a zero crossing detector to an input voltage signal $V_{is}$, where the input voltage signal $V_{is}$ is proportional to a voltage of the input power 110. The resulting signal 616 is then inverted INV and conditioned by suitable LF Gate Drivers to generate the low frequency switch control signals $S_{H1f}, S_{L1f}$.

In the exemplary controller 600 all the triangle voltage signals 610-1, 610-2 . . . 610-$j$ have the same frequency and shape and are shifted equally in phase from each other based on the number j of high frequency switching cells in the plurality of high frequency switching cells 50. For example, a five-level converter will have two high frequency switching cells in the plurality of switching cells 50, and will have two triangle voltage signals shifted one hundred eighty degrees (180°) apart. Thus, all high frequency switching cells in the plurality of high frequency switching cells 50 have the same switching frequency and the PWM control signals 608-1, 608-2, 608-$j$ are phase shifted with respect to each other. The number of triangle voltage signals 610-1, 610-2 . . . 610-$j$ is directly proportional to the number of high frequency switching cells j in the plurality of high frequency switching cells 50.

The PWM strategy employed in the exemplary controller 600 only requires one current sensor 618 to generate the control signals $S_{H1}, S_{L1}, S_{H2}, S_{L2} \ldots S_{Hj}, S_{Lj}$ of all the converter switches.

Advantages offered by the exemplary controller 600 include lower device current stress due to the current-sharing in the plurality of high frequency switching cells 50, and the reduced current ripple. The current ripple is reduced in part because the frequency of the input/output current is multiplied by the number of switching cells j. These two advantages contribute to reducing losses within the apparatus 100 and as a result, the efficiency and power density is improved.

The multi-level nature and reduced current ripple offered by the apparatus 100 mean that EMI requirements can be met without including the two or three-stage input and output filters used in conventional power converter applications. Due to the multi-level feature of the disclosed embodiments, a single stage EMI filter should be enough to comply with most EMI regulations thereby helping to the increase of the overall system power density.

Figure 7:
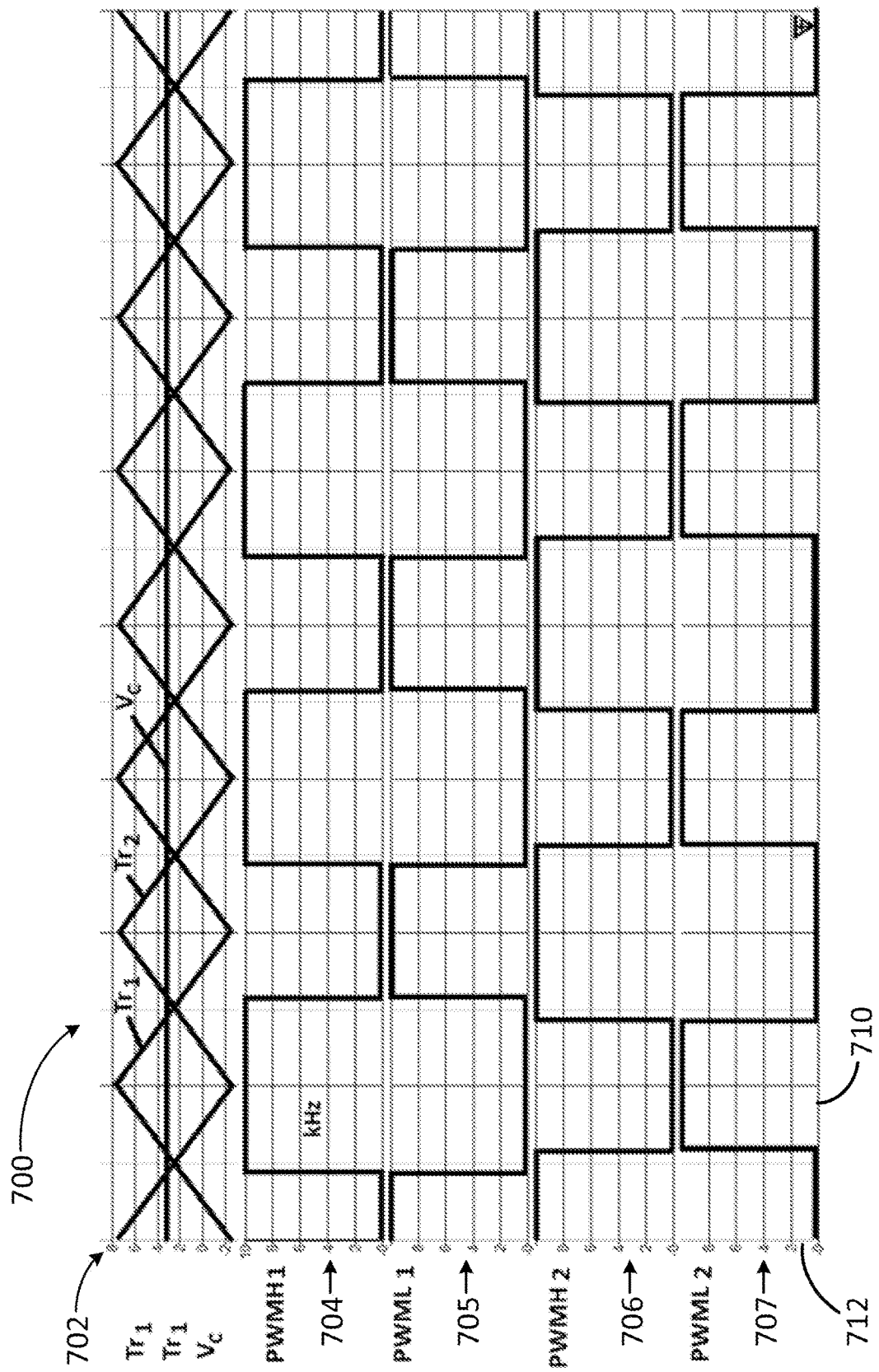
FIG. 7 illustrates exemplary control signals generated within a controller incorporating aspects of the disclosed embodiments.

FIG. 7 illustrates a set of graphs 700 showing simulated control signals generated within the exemplary controller 600 incorporating aspects of the disclosed embodiments. In the set of graphs 700, time is depicted horizontally increasing to the right along the horizontal axis 710. No specific time values are indicated on the set of graphs 700 and it should be understood that the control signals depicted in the set of graphs 700 may be based on any suitable frequency in the kilohertz range, such for example as 20 kilohertz or more.

The set of graphs 700 illustrate simulated control signals appropriate for operating a power converter apparatus having two high frequency switching cells 251, 252 such as the apparatus 200 described above and with reference to FIG. 2. Graph 702 illustrates control signals with voltage increasing vertically as marked along the vertical axis 712. Included in the graph 702 are the control voltage Vc 602, along with two triangle voltage signals $Tr_1, Tr_2$. The two triangle voltage signals $Tr_1, Tr_2$ may be used as described above to generate the set of PWM control signals 608-1, 608-2. Graphs 704, 705, 706, 707 depict the resulting four PWM switch logic signals PWMH1, PWML1, PWMH2, PWML2 necessary for driving the pair of high frequency switches 250, 251 included in the exemplary apparatus 200.

Figure 8:
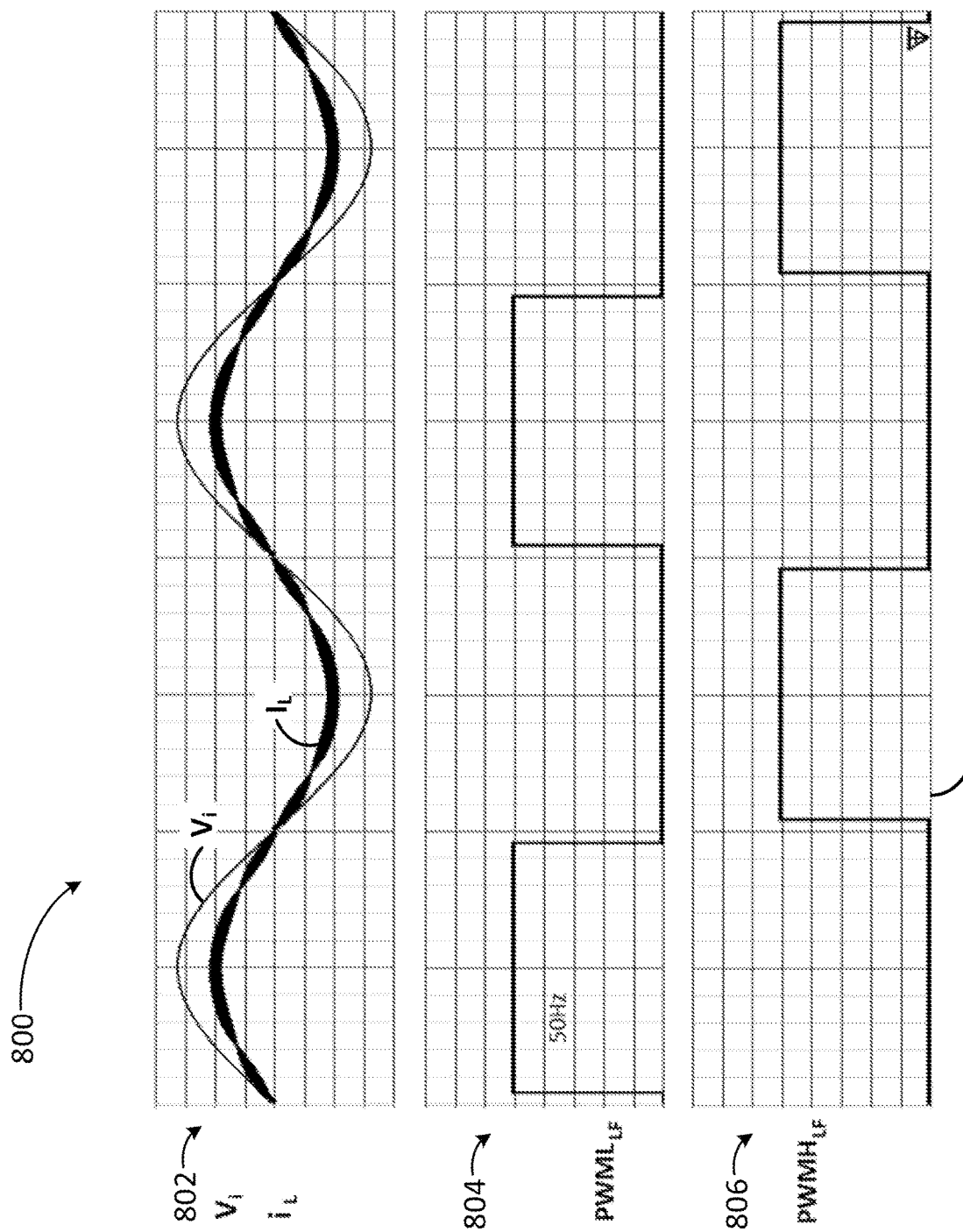
FIG. 8 illustrates a set of graphs of simulated signals generated by the exemplary controller incorporating aspects of the disclosed embodiments.

FIG. 8 illustrates a set of graphs 800 showing simulated signals generated by the exemplary controller 600 incorporating aspects of the disclosed embodiments. In the set of graphs 800 time is depicted horizontally increasing to the right along the horizontal axis 810. The set of graphs 800 show the low frequency switching cell 60 control signals $PWML_{LF}, PWMH_{LF}$ used to drive the lower low frequency switching device 164 and the upper low frequency switching device 162 as described above. The low frequency switching cell 60 may be synchronized with the AC input power 110 and will therefore have a frequency such as for example 50 Hz or 60 Hz.

The upper graph shows a voltage of the input power $V_i$ superimposed on the boost inductor current $I_L$. The reduced ripple current can be seen in the inductor current $I_L$ shown in the graph 802. Graphs 804 and 806 show the lower low frequency switch control signal $PWML_{LF}$ and the upper low frequency switch control signal $PWML_{HF}$ respectively.

Figure 9:
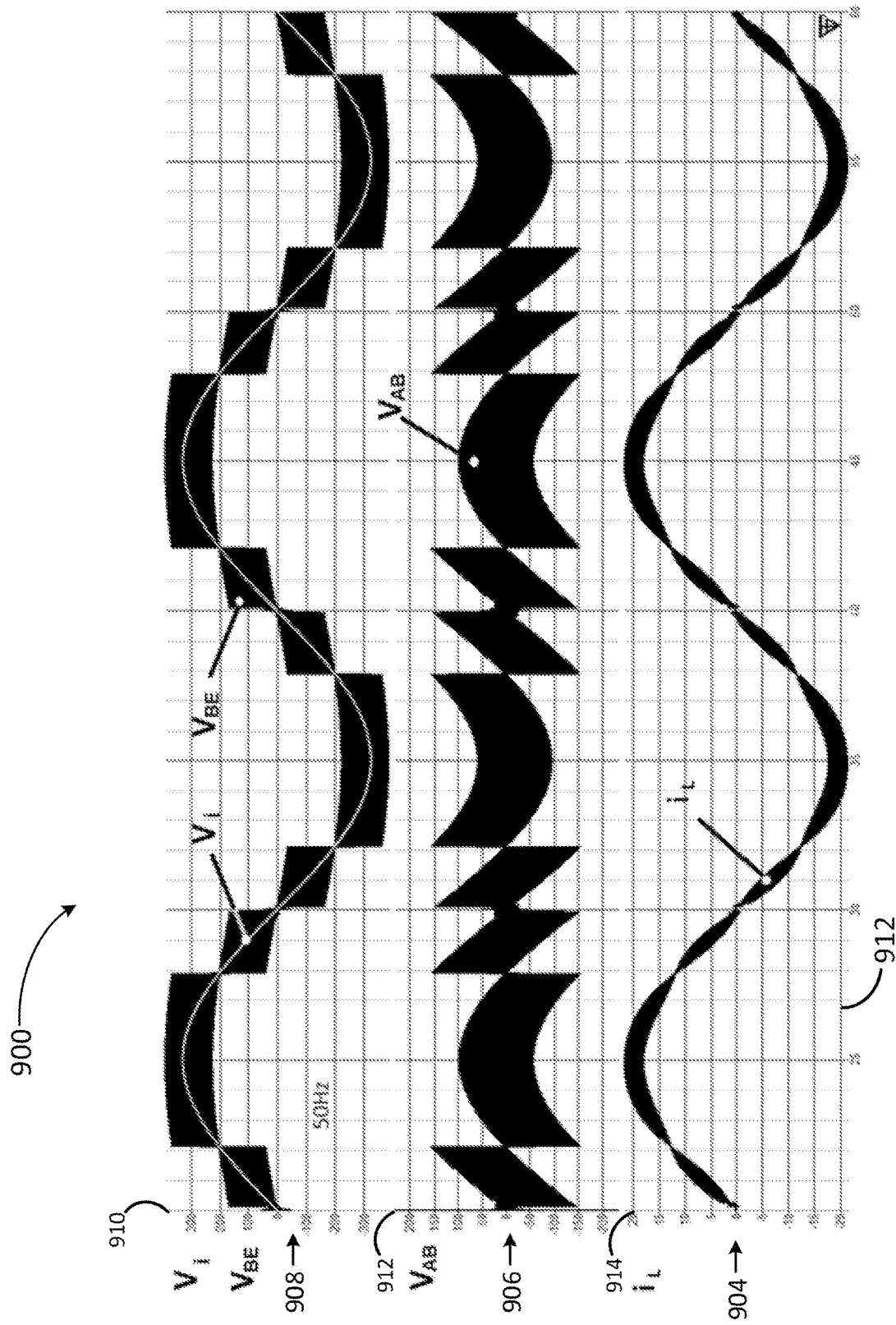
FIG. 9 illustrates a graph showing simulated waveforms of a five-level power conversion apparatus incorporating aspects of the disclosed embodiments.

FIG. 9 illustrates a set of graphs 900 showing simulated waveforms of the five-level apparatus 200 incorporating aspects of the disclosed embodiments. The waveforms shown in the set of graphs 900 may be produced by a single phase PFC five-level totem-pole power converter such as the exemplary apparatus 200 described above and with reference to FIG. 2. The graph 900 depicts time increasing to the right along the horizontal axis 902.

Graph 908 shows the AC voltage 112 Vi superimposed on the primary voltage signal $V_{BE}$, and graph 906 shows the boost inductor 130 voltage $V_{AB}$. In graphs 906 and 908 voltage is depicted increasing upwards along the vertical axes 910 and 912. A beneficial result of a five-level apparatus 200 is the reduced boost inductor 130 voltage $V_{AB}$ as shown in graph 908. Lowering the boost inductor voltage $V_{AB}$ reduces the size and weight of the boost inductor 130 yielding higher power densities.

Boost inductor current $I_L$ is illustrated in the lower graph 904 with current depicted along the vertical axis 914. Graph 904 shows how the multiple $V_{BE}$ voltage levels combined with the higher frequencies created by the plurality of high frequency switching cells 50 results in a reduced current ripple.

Figure 10:
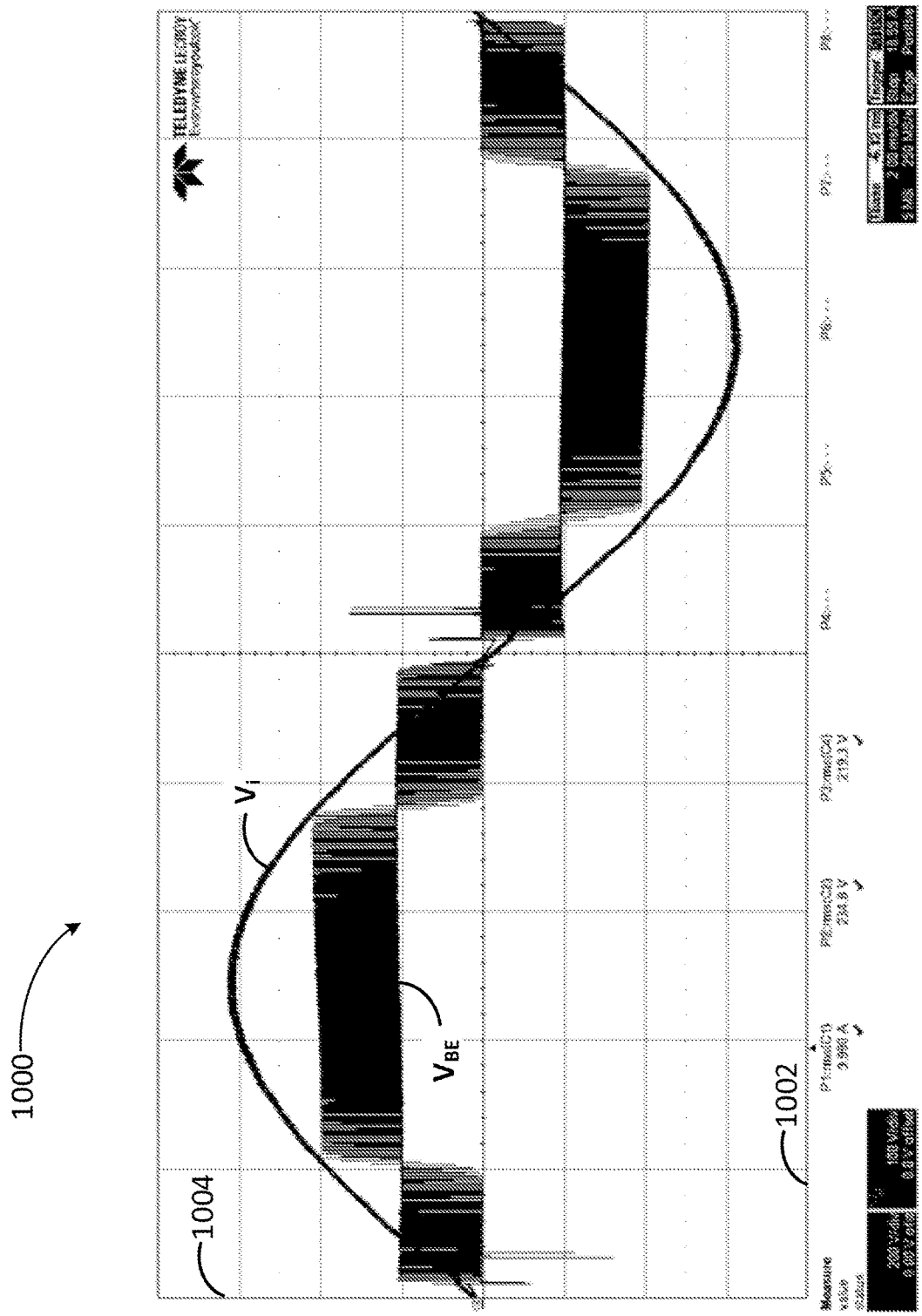
FIG. 10 illustrates a graph showing experimental voltage waveforms obtained from a five-level power converter apparatus incorporating aspects of the disclosed embodiments.

FIG. 10 illustrates a graph 1000 showing experimental voltage waveforms from a five-level power converter apparatus 200 incorporating aspects of the disclosed embodiments. The graph 1000 depicts time increasing to the right along the horizontal axis 1002 and voltage increasing upwards along the vertical axis 1004. Graphs 1000 show actual experimental measurements of the AC input voltage Vi and primary voltage signal $V_{BE}$ taken from a prototype power converter based on the exemplary apparatus 200 described above.

Figure 11:
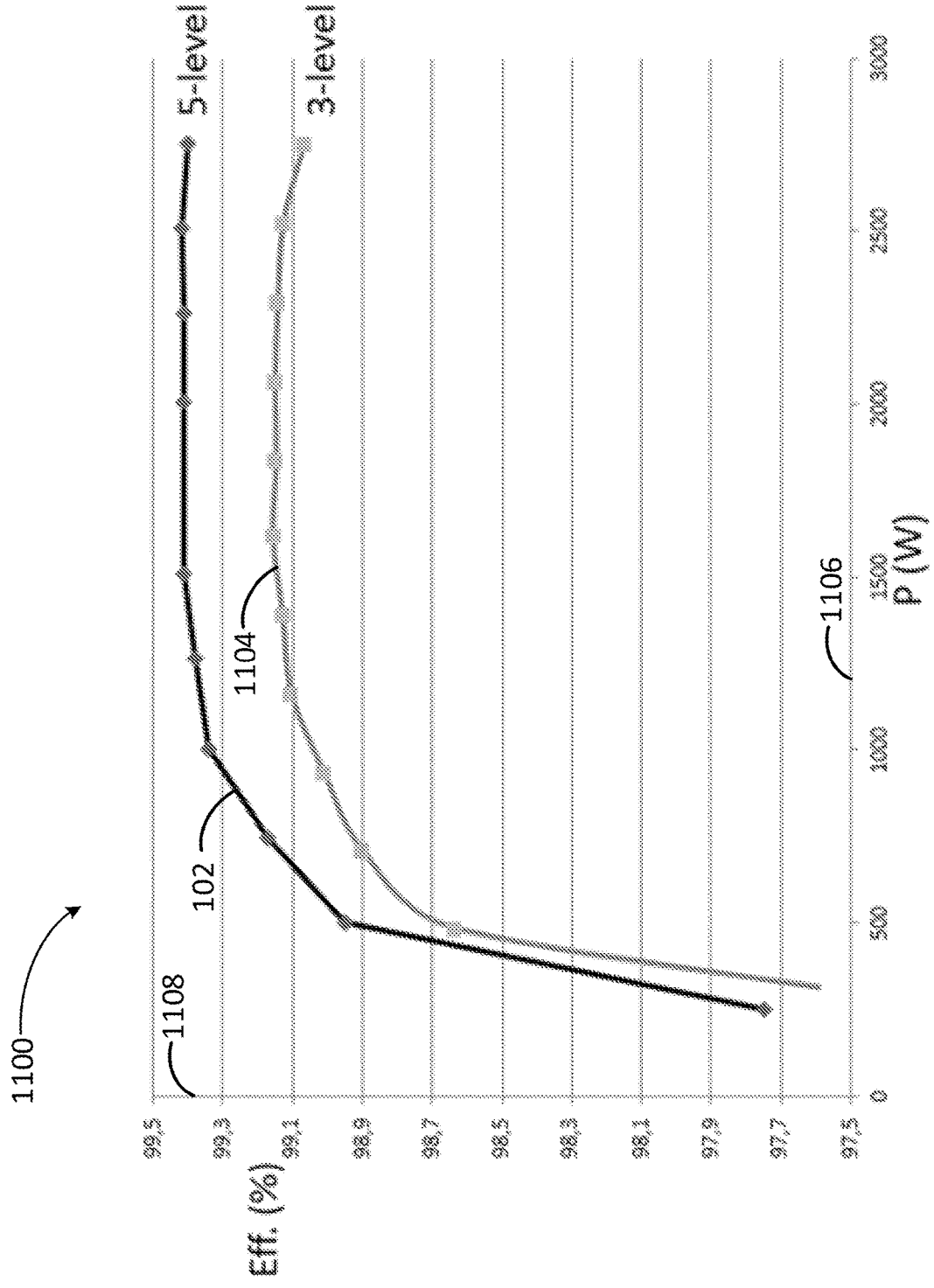
FIG. 11 illustrates a graph comparing the efficiency curve of a five-level power conversion apparatus incorporating aspects of the disclosure to a conventional three-level power converter.

FIG. 11 illustrates a graph 1100 comparing the efficiency curve 1102 of a five-level power conversion apparatus 200 incorporating aspects of the disclosure to the efficiency curve 1104 of conventional three-level power converter. Graph 1100 depicts power output in watts increasing to the right along the horizontal axis 1106 and depicts efficiency in percent increasing upwards along the vertical axis 1108. The efficiency curve 1102 of a five-level converter such as the exemplary apparatus 200 is illustrated in the upper curve labelled 5-level. For reference, the efficiency curve 1104 of a conventional three-level totem-pole converter is shown in the lower curve labelled 3-level.

Figure 12:
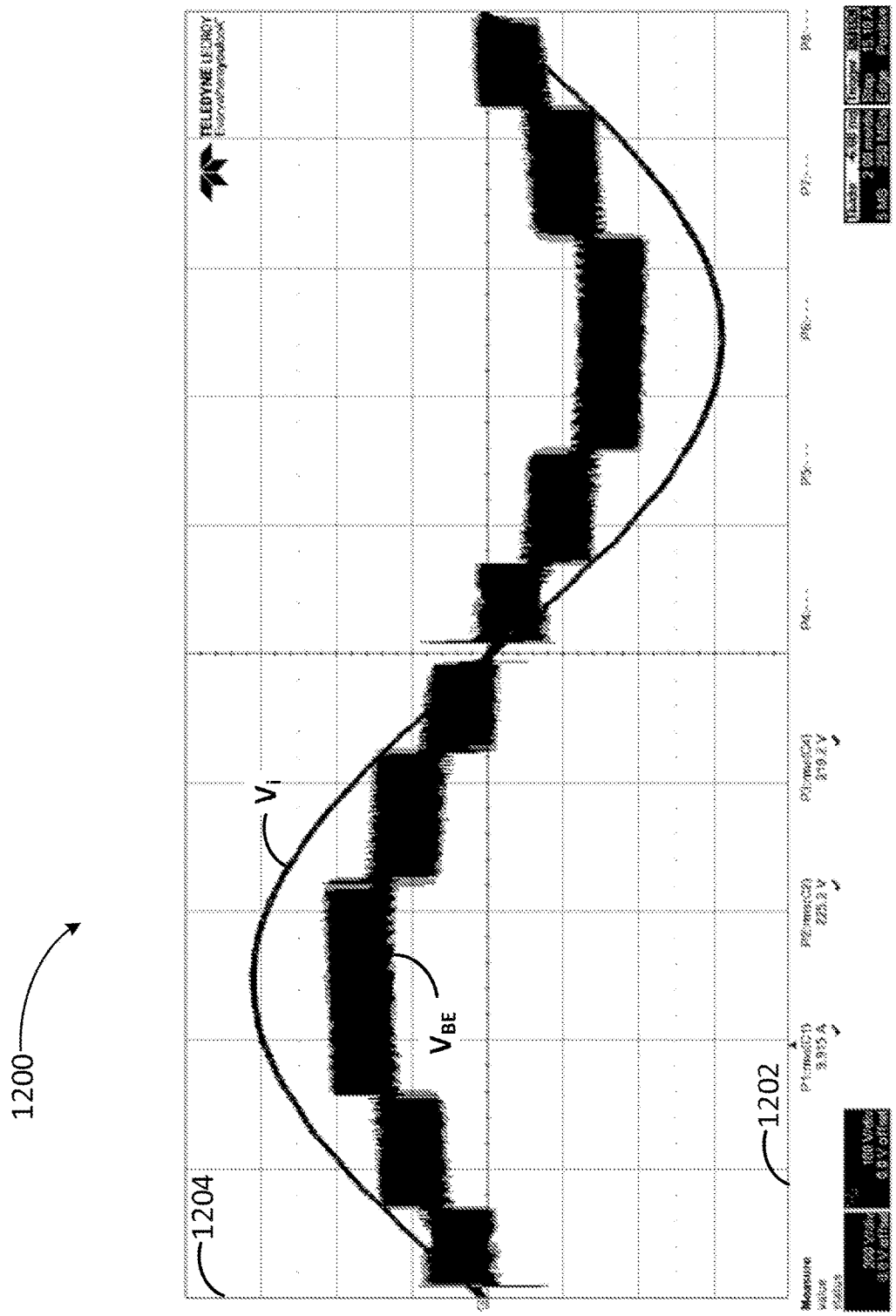
FIG. 12 illustrates a graph showing experimental voltage waveforms obtained from a seven-level power converter apparatus incorporating aspects of the disclosed embodiments.

FIG. 12 illustrates a graph 1200 showing actual experimental voltage waveforms from a seven-level apparatus 300 incorporating aspects of the disclosed embodiments. The graph 1200 depicts time increasing to the right along the horizontal axis 1202 and voltage increasing upwards along the vertical axis 1204. Graphs 1200 show actual experimental measurements of the AC input voltage Vi and primary voltage signal $V_{BE}$ produced by a seven-level apparatus 300 as described above and with reference to FIG. 3.

Figure 13:
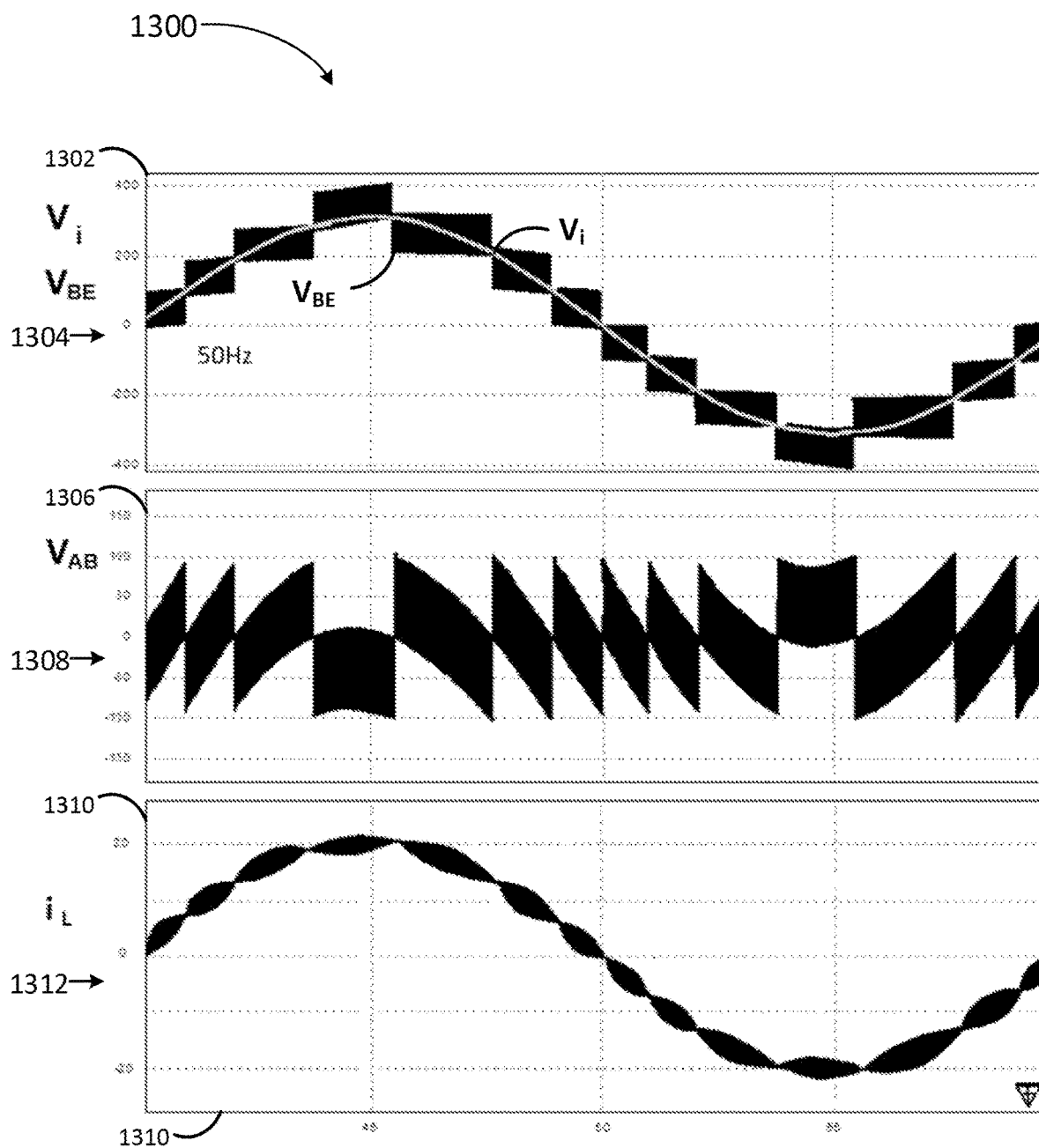
FIG. 13 illustrate a set of graphs showing simulation results of the main waveforms of a single-phase PFC totem-pole nine-level converter apparatus incorporating aspects of the disclosed embodiments.

FIG. 13 illustrate a set of graphs 1300 showing simulation results of the main waveforms of the single-phase PFC totem-pole nine-level converter such as the exemplary apparatus 500. The set of graphs 1300 depicts time increasing to the right along the horizontal axis 1310 and voltage increasing upward along the vertical axes 1302 and 1304. Graph 1312 depicts current increasing upwards along the vertical axis 1312.

Graph 1304 shows the input voltage $V_i$ superimposed on the primary voltage signal $V_{BE}$ for the nine-level apparatus 500 illustrated in FIG. 5 and described above. Graph 1308 shows voltage $V_{AB}$ across the boost inductor 130 of apparatus 500. Comparing the boost inductor voltage $V_{AB}$ for the nine-level apparatus 500 shown in graph 1308 with the boost inductor voltage $V_{AB}$ for the five-level apparatus 200 shown in graph 906 illustrates benefits of the multi-level features of the disclosed embodiments. With the five-level apparatus 200, graph 906 shows the boots inductor voltage $V_{AB}$ varies between about −150 volts and +150 volts. Graph 1308 shows the boost inductor voltage $V_{AB}$ of the nine-level apparatus 500 remains between about −100 volts and +100 volts. Thus, the voltage stress placed on the boost inductor 130 by the nine-level apparatus 500 is significantly less than the voltage stress placed on the boost inductor 130 by the five-level apparatus 200. The reduced voltage stresses provided by the exemplary multi-level apparatus disclosed herein allow the use of higher power density components.

Graph 1312 shows the boost inductor current $I_L$ for the nine-level apparatus 500. As discussed above reductions in current ripple can improve the overall power density of the apparatus 500.

Figure 14:
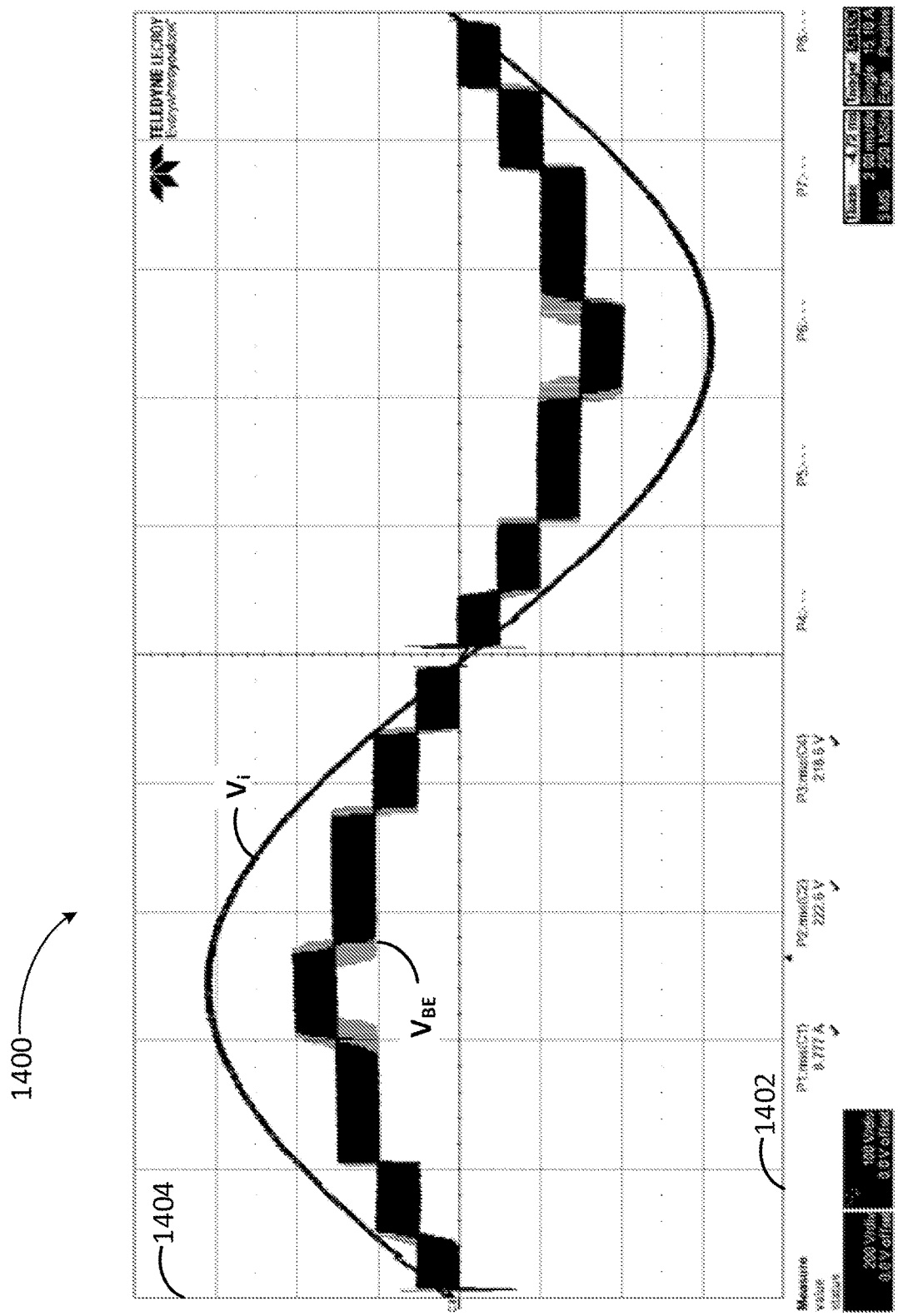
FIG. 14 illustrates a graph showing experimental waveforms for a nine-level apparatus incorporating aspects of the disclosed embodiments.

FIG. 14 illustrates a graph 1400 showing experimental waveforms for a nine-level apparatus 500. The graph 1400 depicts time increasing to the right along the horizontal axis 1402 and voltage increasing upwards along the vertical axis 1404. The graph 1400 shows the input voltage $V_i$ superimposed on the primary voltage signal $V_{BE}$ for the nine-level apparatus 500 illustrated in FIG. 5 and described above.

Figure 15:
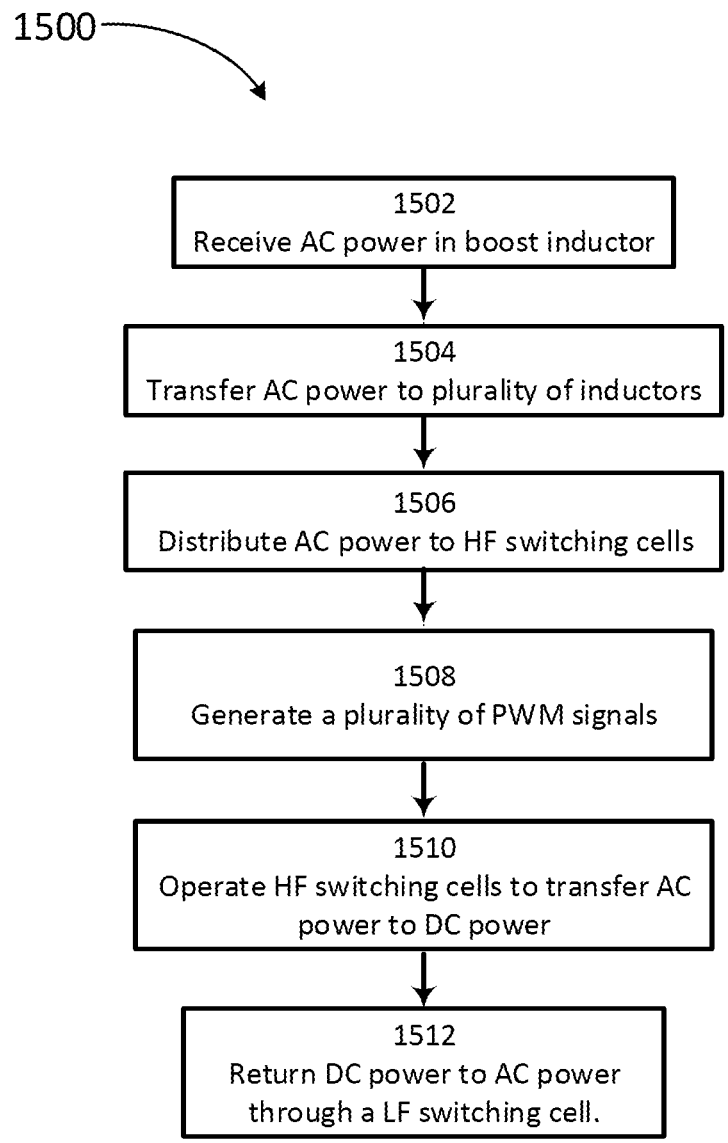
FIG. 15 illustrates a flowchart of an exemplary power conversion method incorporating aspects of the disclosed embodiments.

Referring to FIG. 15 there can be seen a flowchart of an exemplary method 1500 for power conversion incorporating aspects of the disclosed embodiments. The exemplary method 1500 may be performed by any appropriate power conversion apparatus such as the exemplary apparatus 100 described above and with reference to FIG. 1. As an aid to understanding the exemplary method 1500 will be described with reference to the apparatus 100 illustrated in FIG. 1, however those skilled in the art will readily recognize that any suitable power conversion apparatus incorporating a plurality of inductors and plurality of high frequency switching cells may be advantageously employed without straying from the spirit and scope of the disclosure.

The method 1500 includes receiving an AC power, such as the AC power 110. The AC power is received 1502 within a boost inductor, such as the boost inductor 130, during a charging cycle. A charging cycle is a period where switching devices are configured to allow AC current from the AC power 110 to flow through the boost inductor 130 thereby generating a magnetic field within the boost inductor 130.

AC power from the boost inductor 130 is transferred 1504 to a plurality of inductors, such as the plurality of inductors 140. At least one inductor in the plurality of inductors is magnetically coupled to at least one other inductor in the plurality of inductors. In certain embodiments the plurality of inductors may include one or more autotransformers coupled in a tree configuration, such as the tree configuration 404 described above and with reference to FIG. 4. Alternatively the plurality of inductors may include two or more magnetically coupled inductors, such as the configuration 402 described above, where a first end of each inductor is coupled to the boost inductor 130 at a common connection point.

AC power is distributed 1506 from the plurality of inductors to a midpoint of each high frequency switching cell in a plurality of high frequency switching cells, such as the plurality of high frequency switching cells 50. Any suitable inductive network including a plurality of inductors configured to distribute multi-level power from a boost inductor 130 to a plurality of high frequency cells 50 may be advantageously employed.

The plurality of high frequency switching cells are operated using PWM techniques. In one embodiment, a plurality of PWM control signal are generated 1508, where each PWM control signal in the plurality of PWM control signals is configured to drive a corresponding individual high frequency switching cell of the plurality of high frequency switching cells. A separate PWM control signal is generated for each high frequency switching cell in the plurality of high frequency switching cells. Each PWM control signal is shifted equally in phase from other PWM control signals. For example, when driving two high frequency switching cells there will be two PWM control signals shifted 180 degrees apart, and when driving three high switching cells there will be three PWM control signals spaced 120 degrees apart. As described above the PWM control signals may be generated using comparators, such as the comparators based on a plurality of triangle voltage signals, where each triangle voltage signal is spaced or shifted equally in phase from the other triangle voltage signals.

The AC power is transferred 1510 to a DC power bus, such as the DC power bus 170 described above, by the plurality of high frequency switching cells. Each high frequency switching cell includes a pair of semiconductor switching devices coupled in a totem-pole configuration and each switching cell is coupled in parallel to the DC power bus. Power transfer is accomplished by applying PWM control signals to each high frequency switching cell where the PWM control signals are adapted to operate the semiconductor switching devices in each high frequency switching cell to direct current to the appropriate positive or negative side of the DC power.

The DC power is returned 1512 to the AC power through a low frequency switching cell, such as the low frequency switching cell 60 described above. Operation of the low frequency switching cell may for example be synchronized with a fundamental frequency of the AC power thereby providing rectification of the AC power to produce the DC power.

In certain applications bi-directional power conversion is advantageous. Bi-directional power conversion refers to a power converter that is adapted for both conversion from AC to DC as well as DC to AC power. For example, bi-directional conversion is especially beneficial in electric vehicle applications. For illustrative purposes, AC to DC conversion is described above, however in certain embodiments the exemplary method 1500 may also be operated as a DC to AC converter configured to receive the DC power and produce the AC power. Operation as an inverter, i.e. a DC to AC converter, may be accomplished by inverting the PWM control signals which when inverted will operate the plurality of high frequency switching cells to transfer DC power from the DC power bus to the plurality of inductors as an AC power.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. An apparatus, comprising:
   a plurality of high frequency switching cells comprising a first high frequency switching cell connected in parallel with a second high frequency switching cell;
   a plurality of inductors inductively coupling a common connection point with at least one first connection point and at least one second connection point, wherein at least one inductor of the plurality of inductors is magnetically coupled to at least one other inductor of the plurality of inductors, wherein the plurality of inductors comprises at least three auto-transformers connected together in a tree configuration, a center tap of a first auto-transformer forms the common connection point and winding ends of two other auto-transformers form four respective connection points including the at least first and second connection points, wherein
   a first midpoint of the first high frequency switching cell being connected to the at least one first connection point, and a second midpoint of the second high frequency switching cell being connected to the at least one second connection point;
   a boost inductor having a first end coupled to a first alternating current (AC) voltage and a second end coupled to the common connection point;
   a low frequency switching cell connected in parallel with the plurality of high frequency switching cells, a third midpoint of the low frequency switching cell coupled to a second AC voltage, and
   a controller configured to generate a plurality of pulse-width modulation (PWM) switch control signals including a plurality of high frequency PWM switch control signals to control the plurality of high frequency switching cells and a plurality of low frequency PWM switch control signals to control the low frequency switching cell.

2. The apparatus according to claim 1, wherein the first high frequency switching cell comprises a first high frequency switching device connected between a first direct current (DC) voltage and the first midpoint of the first high frequency switching cell, and a second high frequency switching device connected between the first midpoint and a second DC voltage.

3. The apparatus according to claim 1, wherein the second high frequency switching cell comprises a first high frequency switching device coupled between a first DC voltage and the second midpoint of the second high frequency switching cell and a second high frequency switching device connected between the second midpoint and a second DC voltage.

4. The apparatus according to claim 2, wherein the second high frequency switching cell comprises a first high frequency switching device coupled between the first DC voltage and the second midpoint of the second high frequency switching cell and a second high frequency switching device connected between the second midpoint and the second DC voltage.

5. The apparatus according to claim 1, wherein the common connection point is coupled to the at least one first connection point through a first inductor of the plurality of inductors and the common connection point is coupled to the at least one second connection point through a second inductor of the plurality of inductors.

6. The apparatus according to claim 2, wherein the common connection point is coupled to the at least one first connection point through a first inductor of the plurality of inductors and the common connection point is coupled to the at least one second connection point through a second inductor of the plurality of inductors.

7. The apparatus according to claim 5, wherein the first inductor is coupled to the second inductor with an opposing magnetic coupling.

8. The apparatus according to claim 5, wherein the first inductor is coupled to the second inductor with an aiding magnetic coupling.

9. The apparatus according to claim 1, further comprising a filter coupled between the low frequency switching cell and a DC power.

10. The apparatus according to claim 1, further comprising an EMI filter connected between an AC power and the boost inductor.

11. The apparatus according to claim 1, wherein the plurality of high speed PWM switch control signals are generated based on a control voltage and a plurality of triangle voltage signals, wherein each triangle voltage signal of the plurality of triangle voltage signals is shifted equally in phase based on a number of high frequency switching cells in the plurality of high frequency switching cells.

12. The apparatus of claim 1, wherein the plurality of high frequency switching cells is coupled in parallel with a direct current (DC) power and wherein the apparatus is configured to receive an AC power and produce the DC power.

13. The apparatus of claim 1, wherein the apparatus is configured to receive a direct current (DC) power and produce an AC power.

14. A method, comprising:
receiving an alternating current (AC) power within a boost inductor;
transferring the AC power to a plurality of inductors, wherein at least one inductor of the plurality of inductors is magnetically coupled to at least one other inductor of the plurality of inductors, wherein the plurality of inductors comprises at least three auto-transformers connected together in a tree configuration, a center tap of a first auto-transformer forms a common connection point and winding ends of two other auto-transformers form four respective connection points;
distributing the AC power to each midpoint of a plurality of high frequency switching cells, which is coupled in parallel with a direct current (DC) power;
transferring the AC power to the DC power by operating the plurality of high frequency switching cells based on a plurality of high frequency pulse-width modulation (PWM) switch control signals; and
returning the DC power to the AC power through a low frequency switching cell, wherein a switching frequency of the low frequency switching cell is synchronized with a primary frequency of the AC power based on a plurality of low frequency PWM switch control signals.

15. The method of claim 14, further comprising generating a plurality of PWM control signals including the plurality of high speed PWM switch control signals and the plurality of low speed PWM switch control signals, wherein each of high frequency PWM switch control signals is shifted equally in phase based on a number of high frequency switching cells in the high frequency switching cells.

16. The method of claim 14, further comprising receiving the DC power and producing the AC power.

* * * * *